United States Patent
Eiriksson et al.

(10) Patent No.: US 10,225,239 B2
(45) Date of Patent: Mar. 5, 2019

(54) METHOD FOR IN-LINE TLS/SSL CLEARTEXT ENCRYPTION AND AUTHENTICATION

(71) Applicant: Chelsio Communications, Inc., Sunnyvale, CA (US)

(72) Inventors: Asgeir Thor Eiriksson, Belmont, CA (US); Atul Gupta, Dehradun (IN); Suman Kumar M Venkata, Bengalura (IN)

(73) Assignee: Chelsio Communications, Inc., Sunnyvale, CA (US)

( * ) Notice: Subject to any disclaimer, the term of this patent is extended or adjusted under 35 U.S.C. 154(b) by 211 days.

(21) Appl. No.: 15/279,894

(22) Filed: Sep. 29, 2016

(65) Prior Publication Data

US 2018/0091483 A1     Mar. 29, 2018

(51) Int. Cl.
   *H04L 29/06*    (2006.01)
   *G06F 21/60*    (2013.01)

(52) U.S. Cl.
   CPC ........ *H04L 63/0428* (2013.01); *G06F 21/602* (2013.01); *H04L 63/166* (2013.01)

(58) Field of Classification Search
   CPC .. H04L 63/0428; H04L 63/166; G06F 21/602
   See application file for complete search history.

(56) References Cited

U.S. PATENT DOCUMENTS

| | | | | |
|---|---|---|---|---|
| 6,356,951 B1* | 3/2002 | Gentry, Jr. | ............... | H04L 69/22 709/217 |
| 6,964,008 B1* | 11/2005 | Van Meter, III | ..... | G06F 11/1004 714/766 |
| 2004/0120349 A1* | 6/2004 | Border | .................. | H04L 1/0066 370/474 |
| 2008/0162922 A1* | 7/2008 | Swartz | .................. | H04L 63/162 713/150 |
| 2012/0177047 A1* | 7/2012 | Roitshtein | ............... | H04L 69/22 370/392 |
| 2014/0032987 A1* | 1/2014 | Nagaraj | ................ | H04L 65/604 714/747 |

OTHER PUBLICATIONS

Eiriksson et al., U.S. Appl. No. 14/804,007, filed Jul. 20, 2015.

* cited by examiner

*Primary Examiner* — Meng Li
(74) *Attorney, Agent, or Firm* — Beyer Law Group LLP

(57) ABSTRACT

We describe a method, device and system for communicating to a peer via a network. A segment is received formatted according to a first network protocol, the received segment having clear-text payload data in a payload portion of the received segment. A cryptographic operation is performed on at least a portion of the clear-text payload data of the received segment, according to a cryptographic protocol, and a PDU is embedded according to the cryptographic protocol into the payload portion of the received segment. Header data, in a header portion of the received segment, is to account for a change to the received segment resulting from the cryptographic operation performance. The received segment, having the embedded PDU according to the cryptographic protocol and the adjusted header data, is transmitted to a peer via the network.

20 Claims, 8 Drawing Sheets

METHOD FOR IN-LINE TLS/SSL CLEARTEXT ENCRYPTION AND AUTHENTICATION

TECHNICAL FIELD

The present invention relates to a Network Interface Controller (NIC) device encrypting and authenticating clear text and producing cipher text in-line with stateless NIC protocol processing operations.

BACKGROUND

Transport Layer Security and its predecessor Secure Socket Layer provides network security and finds widespread use is applications such as content delivery networks CDN, web servers and VPN. TLS provides both privacy and integrity of data exchanged over a network. TLS is primarily used with reliable transport protocol such as TCP, however it is also implemented with datagram oriented transport protocol and termed datagram transport layer security DTLS.

A Network Interface Controller (NIC)—which may be, for example, network interface circuitry, such as on a PCI card connected to a host computer via a PCI host bus—is typically used to couple the host CPU to a packet network through at least one interface, called a port. NIC circuitry has been an area of rapid development as advanced packet processing functionality and protocol offload have become requirements for so called "smart NICs".

In conventional systems/methods, when encryption is used, the encryption is performed on the application data, prior to forming segments for communication across a network. Such systems/methods introduce latency associated with transmitting such encrypted application data.

SUMMARY

Inline TLS/SSL is a method of offloading the processing intensive burden of encryption from a system running an application to a NIC. A NIC is equipped with TLS/SSL cryptographic capability and the ability to encrypt and/or compute message authentication codes (MAC) in-line with sending the payload. The capability increases the efficiency of the TLS/SSL encryption process by doing the encryption in-line with sending of the data thereby cutting in half the required memory bandwidth required to perform the TLS/SSL send operation and also significantly lowering the latency associated with sending TLS/SSL data. It has been estimated that two thirds of all Internet traffic involve media streaming and these streams are increasingly being encrypted. The streaming of video content by Content Delivery Networks such as Netflix, YouTube, and Amazon is almost exclusively send traffic and the optimization of this use case is therefore useful.

DETAILED DESCRIPTION

Figure 1:
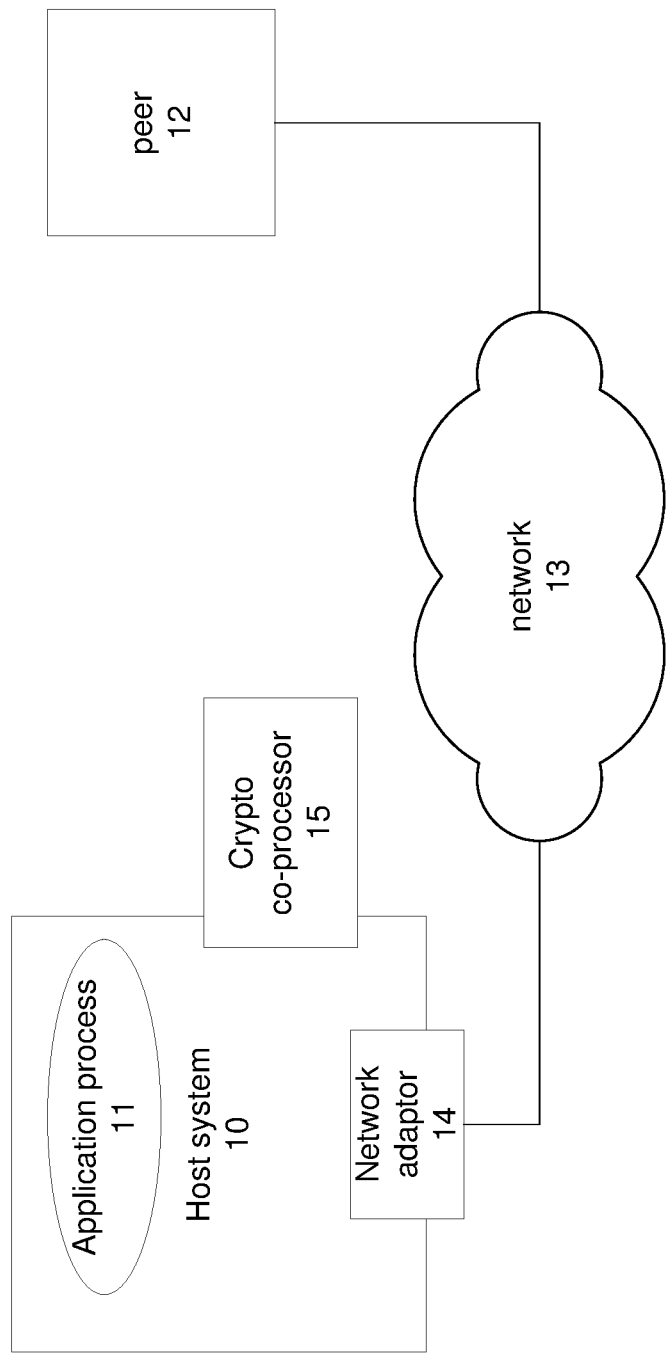
FIG. 1 is a block diagram illustrating a host system with a network adapter and showing the steps required to send TLS/SSL encrypted data.
Figure 6:
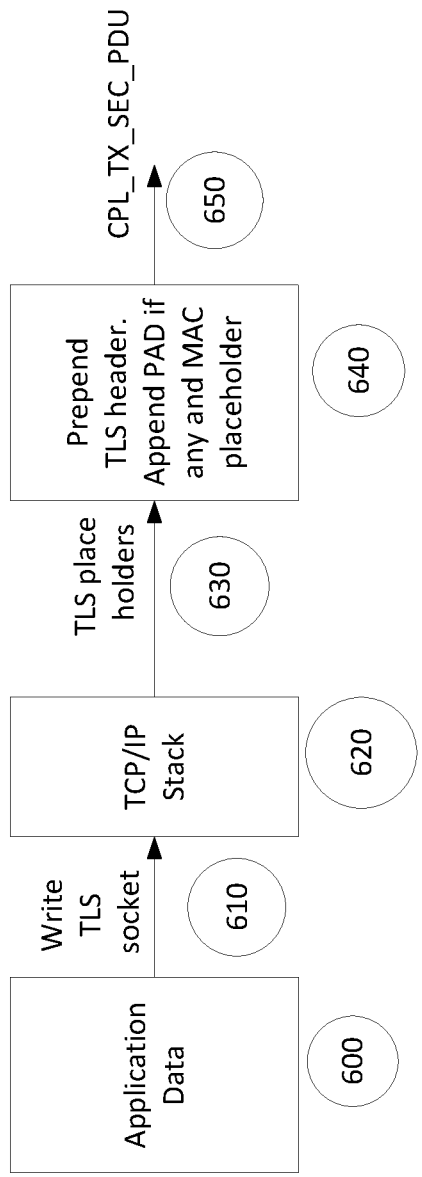
FIG. 6 is a block diagram illustrating the Inline Processing of TLS payload where TLS placeholders are decided after packet exits the TCP/IP stack.

We describe an enhancement to the send processing of TLS/SSL encrypted data. Referring to FIG. 1, a NIC 14 is coupled to a host system 10, using an attachment bus. The attachment bus can be, for example, a PCI bus or it can be an ARM AMBA bus within a system on a chip (SoC). The NIC communicates through a network 13 with a peer 12. When the network traffic is to be encrypted with a protocol such as TLS/SSL, the typical arrangement is to use a crypto co-processor 15 attached to the host system or as part of the host system such as the Intel NI instructions and to encrypt and compute authentication codes (MAC) and to decrypt and authenticate an inbound stream. One disadvantage with this arrangement is that an extra copy to and from memory of the stream is utilized to encrypt the clear text to cipher text before sending the cipher text to the network. For high speed networks, this copy can be an overall bottleneck that limits the send rate of encrypted data. The extra copy, in addition, can lead to a higher latency compared to an approach that would avoid the copy. In an embodiment of the invention, this copy can be avoided by, instead of having a crypto co-processor 15, the crypto processing is performed in-line with the sending within the network adapter 14. The in-line processing described in this invention is compatible with other processing performed by the NIC. The TLS/SSL encrypted stream can for example be traffic managed similar to the methods described in U.S. Pat. No. 8,213,427 which can be significant because one use case of TLS/SSL is the streaming of video content at a fixed rate, and this fixed rate is enforced with traffic management We describe how the in-line TLS/SSL processing can be achieved with minimal modifications to the existing TCP/IP software stack and then we identify several optimizations that are possible with more extensive modifications to the TCP/IP software stack. To achieve in-line TLS/SSL operation, the TCP/IP stack may send one TLS/SSL payload at a time to the NIC and in case of packet loss, the stack, with the assistance of the TLS driver, may re-send those payloads the same way as originally sent. This comes about because the TLS/SSL cryptographic processor operates on whole TLS/SSL PDU at a time and in the case of re-transmission, it is advantageous for the same PDU to be resent for the same result. Referring to FIG. 6, the TLS/SSL payload are encapsulated within a CPL 600 message and many can be in flight to the NIC at the same type, though preferably exactly one TLS/SSL payload is contained within each CPL message. (A CPL message is a message that is used for communication between the host and the NIC.) In addition, the TLS driver translates the peer advertised receive window size to take into account that the TLS driver and crypto processor is adding TLS/SSL headers and tail information to the TCP byte stream that is received from the TCP/IP stack.

Figure 5:
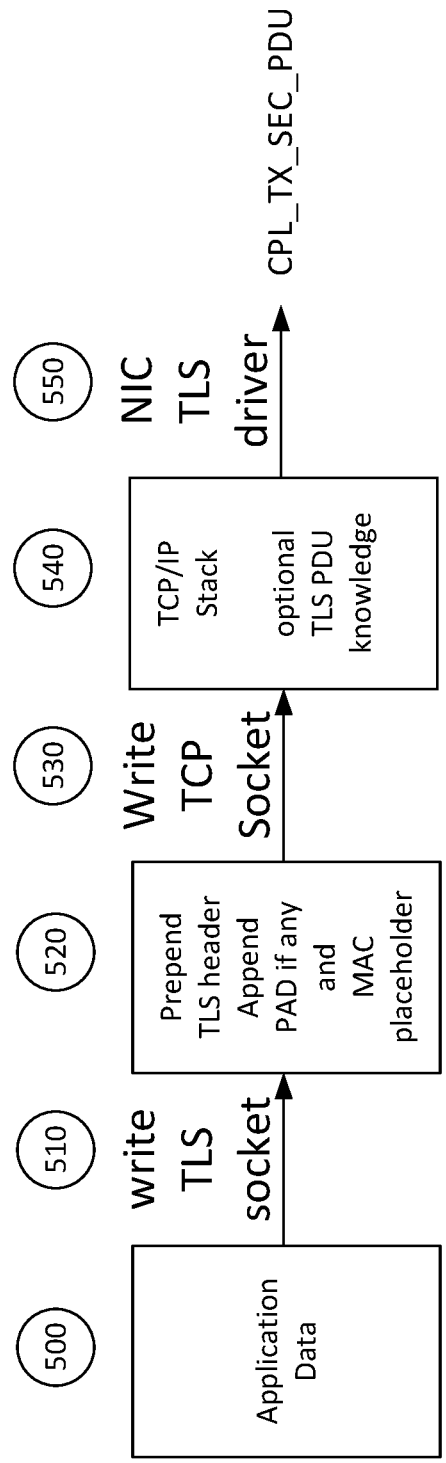
FIG. 5 is a block diagram illustrating the In-line Processing of TLS payload where TLS placeholders are determined before handing over the payload to a TCP/IP stack.

We describe two approaches to in-line processing of TLS/SSL, though other approaches are possible consistent with broad aspects of the invention set forth herein. In one approach, as shown in FIG. 6, application payload which is one complete TLS fragment is input to a host TCP/IP stack. The TCP stream comprising a single TLS payload is then input to a TLS/SSL driver where space is reserved for place holders of TLS header, MAC and Pad before inline processing by network adapter 14. In another approach, as shown in FIG. 5, a complete and single TLS fragment with space reserved for place holders of TLS header, MAC and pad included is input to TCP/IP stack before inline processing by network adapter 14.

The first approach typically involves less modification to an existing host TCP/IP stack, and this is also the approach that is advantageously used if the TLS encapsulation and the sequence number management were offloaded to the NIC. The second approach typically involves more extensive modifications to a host TCP/IP stack but might result in a more efficient solution.

Figure 2:
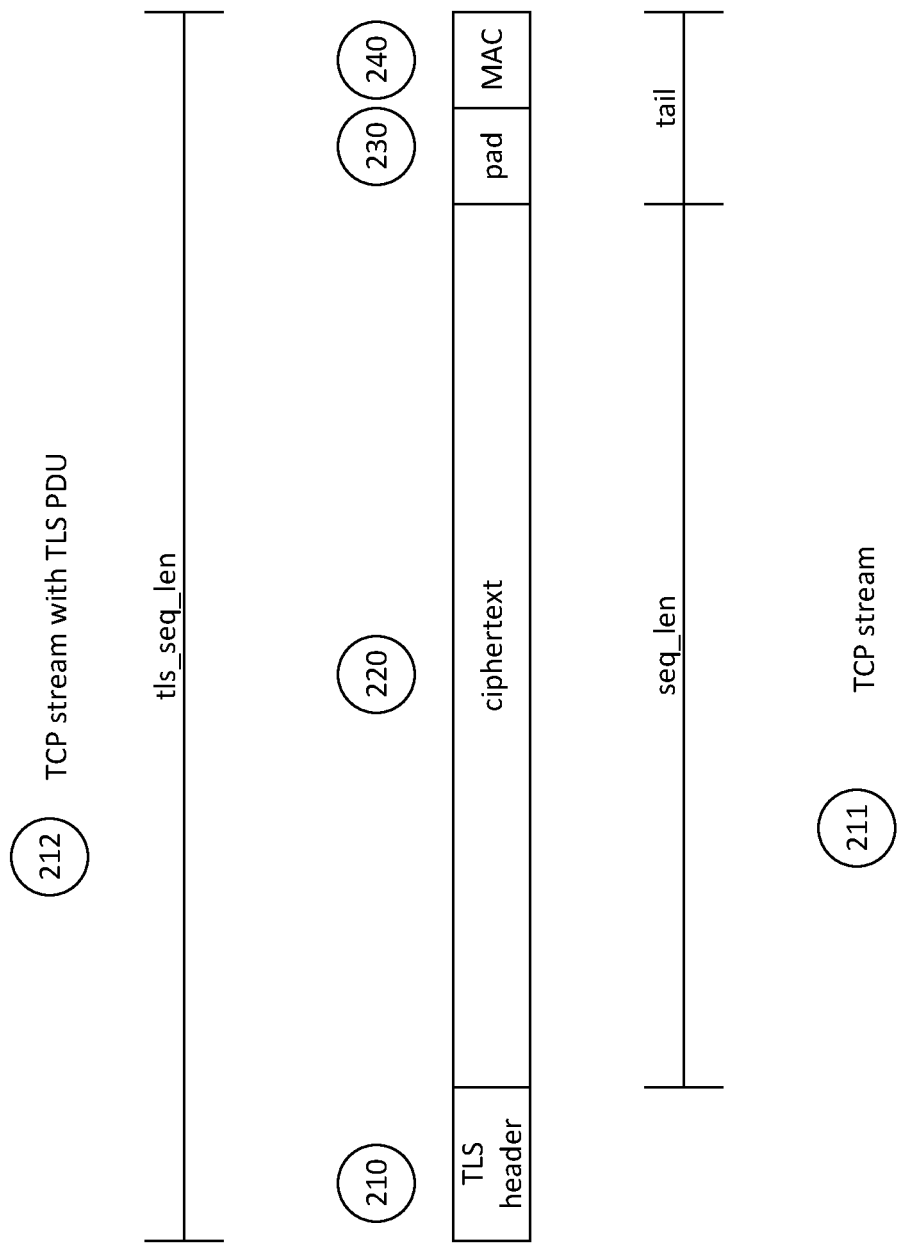
FIG. 2 is a block diagram illustrating the encapsulation of TCP clear text payload within a TLS/SSL cipher text PDU.

Referring now to FIG. 2, the TLS/SSL protocol is implemented using Protocol Data Units (PDU) that are embedded in the payload of a lower layer protocol. For example, the TLS/SSL protocol may be implemented on top of the TCP protocol, which is a byte stream protocol at the transport layer. The application payload, which is the clear text, is encrypted into cipher text 220, and a TLS header 210 is added in front of the payload, and a pad 230 and message authentication code (MAC) 240 are added to the end of the clear text to form a TLS/SSL protocol data unit (PDU). We refer here to the pad and MAC collectively as the tail. We refer to clear text length which is the same as the cipher text length as seq_len, and the TLS/SSL PDU length is here referred to as tls_seq_len. Referring now back to FIG. 1, we note that when the TLS/SSL processing is performed in-line that, in addition to the crypto operation, there is more data sent from that the NIC 14, the TLS/SSL PDU, than is input to the NIC from the host system. The original TCP stream 211, is expanded for each PDU, to the TCP stream with TLS PDU 212. We also note that the crypto processing is performed on a whole TLS/SSL PDU and therefore, in the case of re-transmission due to a TCP packet loss, a whole PDU would generally be re-transmitted. We finally note that the peer 12 will acknowledge the receipt of the TLS/SSL encrypted data stream but, because the TCP protocol is a byte stream, it is not guaranteed that it will acknowledge a whole TLS/SSL PDU, e.g. there might be a lack of resources that cause the peer 12 only to be able to acknowledge part of a PDU and the peer 12 in general does not know that the TCP byte stream contains a PDU. In the general case, the receiver first processes the TCP protocol and then the TLS/SSL protocol is processed.

Figure 3:
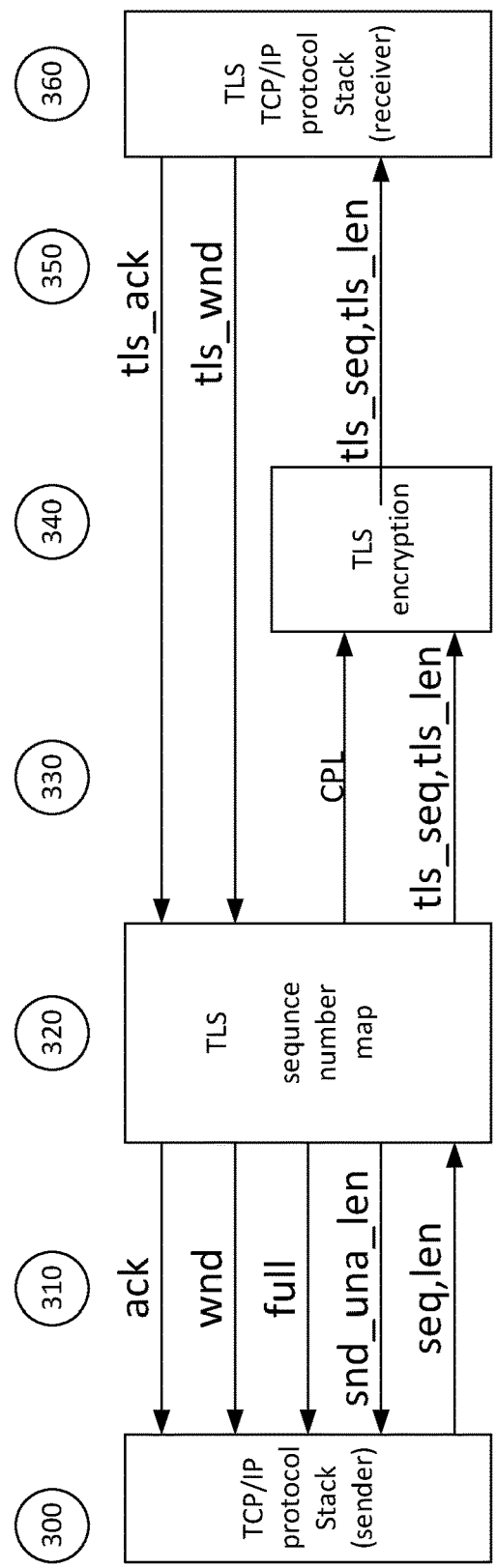
FIG. 3 is a block diagram illustrating the relationship between sequence numbers and acknowledge numbers for the TCP payload with and without TLS/SSL PDU.

Referring now to FIG. 3, a host TCP/IP protocol stack 300 sends a TCP/IP segment with sequence number seq and with payload length len 310 that is then input to a TLS sequence number map module 320 that adjusts the TCP sequence numbers and the payload length to account for the TLS/SSL header and tail information, and these new sequence numbers are referred to as tls_seq and tls_len. The TLS header information carries information that helps the receiver process the TLS information and the tail information stores MAC and padding if any. The TLS/SSL overhead is for every sent packet, and the difference in the TCP/IP sequence number seq and the tls_seq number therefore increases with each TLS/SSL packet sent. The TLS encryption process 340 receives CPL header information that instructs how the TLS/SSL processing is to be performed, and a TCP/IP packet with cipher text is sent 350 to the receiver 360. The receiver acknowledges the received packet with tls_ack 350 that corresponds to the last tls_seq+tls_len sequence number if that frame was received in order or tls_ack corresponds to the sequence number that the receiver is expecting next if the last frame is received out of order. When tls_ack is received by the TLS sequence number map module 320, it maps tls_ack to the corresponding ack 310 using a table that remembers the sequence numbers and lengths of all the outstanding TLS/SSL PDU. The resulting ack is sent to the TCP/IP stack 300 that updates the state information for the TCP/IP connection. The receiver 360 advertises a receive window size tls_wnd 350 that is mapped by the TLS sequence number map module 320 to the TCP advertised window size. The mapping module subtracts all the TLS header and tail bytes that have been sent and not acknowledged and subtracts the total number from the advertised window size 350 in deriving wnd 310.

It is possible that packets are lost and it is also possible that the receiver doesn't acknowledge parts of a received packet because of resource constraints. In the packet loss case, the sender typically retransmits the lost packet and it resends a whole TLS/SSL PDU. For this purpose, the TLS sequence number map module may maintain the length of the payload corresponding to the oldest data not acknowledged snd_una_len 210. In the case where receiver only acknowledges part of a TLS/SSL PDU, the TLS sequence number map module maps the received tls_ack to an ack 330 that corresponds to the end of the most recent PDU before ACK. The TLS sequence number map module may have limited capacity to store mapping information, and it signals that it has exhausted those resources by raising the full signal 310.

Figure 4:
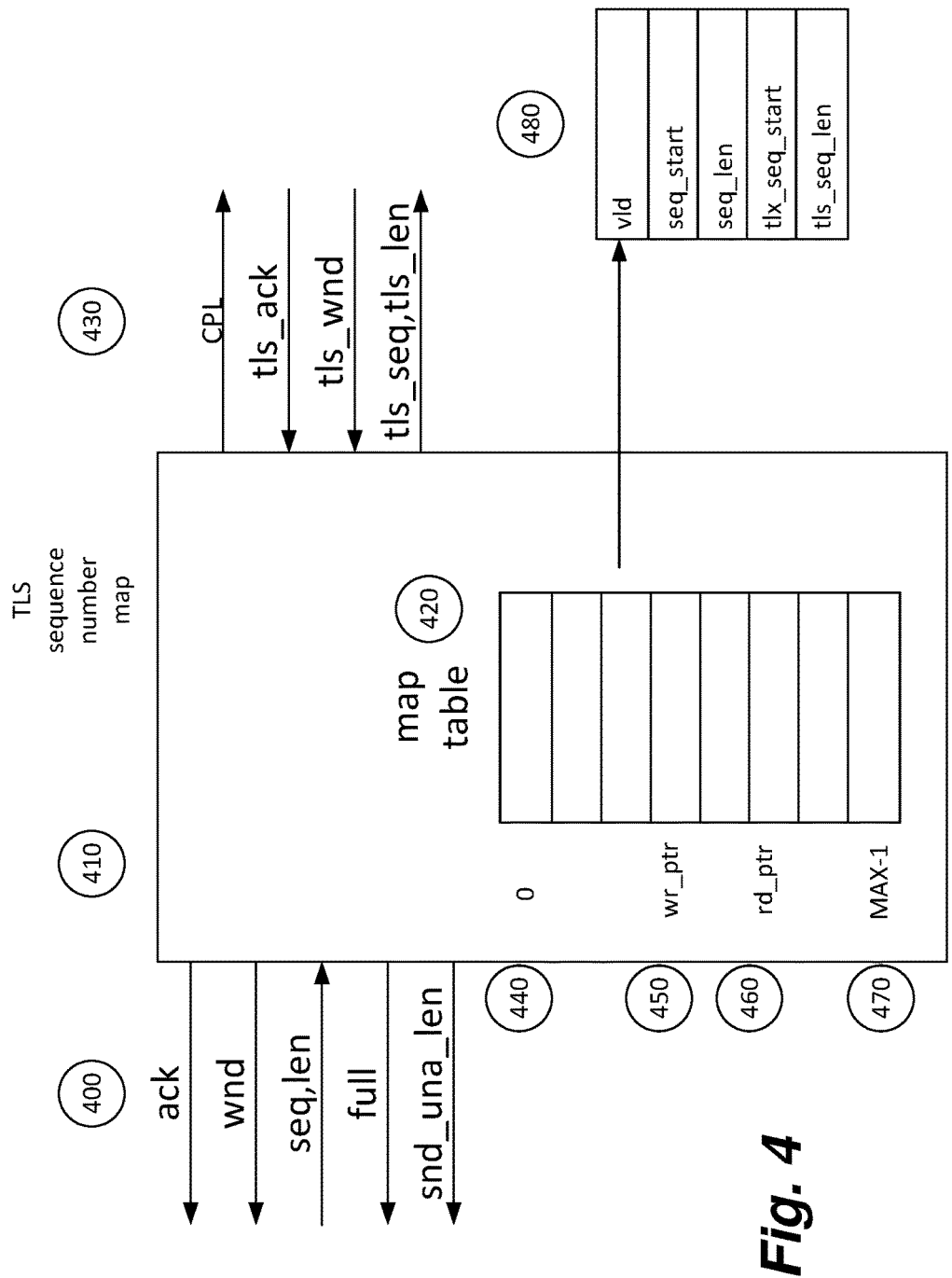
FIGS. 4, 4a and 4b are collectively a block diagram illustrating a mapping mechanism from one set of sequence and acknowledge numbers to another.

Referring now to FIG. 4 that shows one general method to implement the mapping from seq and len in FIG. 3, to tls_seq and tls_len, and also to map tls_ack back to ack, and tls_wnd to wnd. The map table 420 includes TBL_MAX number of entries. There is a write pointer wr_ptr that is initially set to 0, and a read pointer rd_ptr that is initially set to 0. When a packet arrives 400 with sequence number seq and length len, the value is compared to the entry at wr_ptr−1 the most recently written entry, and if seq is larger, then a new entry is created and initialized with seq_start, seq_len, and tls_seq_start and tls_seq_len 480. The tls_seq_start is computed iteratively from map_table[wr_ptr−1].tls_seq_start+map_table[wr_ptr−1].tls_len and map_table[wr_ptr].tls_len is len+TLS/SSL header length+TLS/SSL tail length. The wr_ptr is then incremented wr_ptr+1 MOD TBL_MAX, i.e. when the value reaches TBL_MAX the next time it is incremented, it is set to 0. When the sequence number 400 seq is not larger than map_table[wr_ptr].seq_start, then this indicates a re-transmission and a new table entry is not created. When an acknowledgement tls_ack is received from the peer, the value is compared to the map_table entries starting from rd_ptr to wr_ptr. When the entry is found that contains the ack in its range i.e. ack is in the range [map_table[i].tls_seq_start+map_table[i].tls_seq_start+map_table[i].tls_seq_len], then the ack is acknowledging all the PDU from map_table[rd_ptr] up to map_table[i], and if ack matches the last byte of map_table[i] then it is acknowledging that entry also. Once this range determination is completed, the rd_ptr can be incremented from its current value to i or, in the "matches last byte" case, to i+1. The rd_ptr and wr_ptr increment operations are modulo TBL_MAX, i.e. the value wraps back to 0 when the current value is equal to TBL_MAX and is incremented. Because the tls_seq_start is determined from the map_table[wr_ptr−1] entry, there is always one entry left unused in the table and at time 0, the map_table[TBL_MAX] entry is initialized with initial value for seq and the length to 0 for that entry.

The oldest entry in the table is map_table[rd_ptr] and when retransmission needs to happen from snd_una. the oldest sequence number that has not been acknowledged the length of the TLS/SSL PDU snd_una_len 400 is determined from map_table[rd_ptr].seq_len. When a different retransmission scheme is in use, the table can be traversed from rd_ptr entry until finding the PDU that is to be re-transmitted, i.e., when sequence number S0 is to be re-transmitted finding a table entry K, such that S0 contained in the range [map_table[k].seq_start,map_table[k].seq_start+map_table[k].seq_len], in which case the re-transmission happens starting from map_table[k].seq_start and the length of the PDU is map_table[k].seq_len.

Figure 4A:
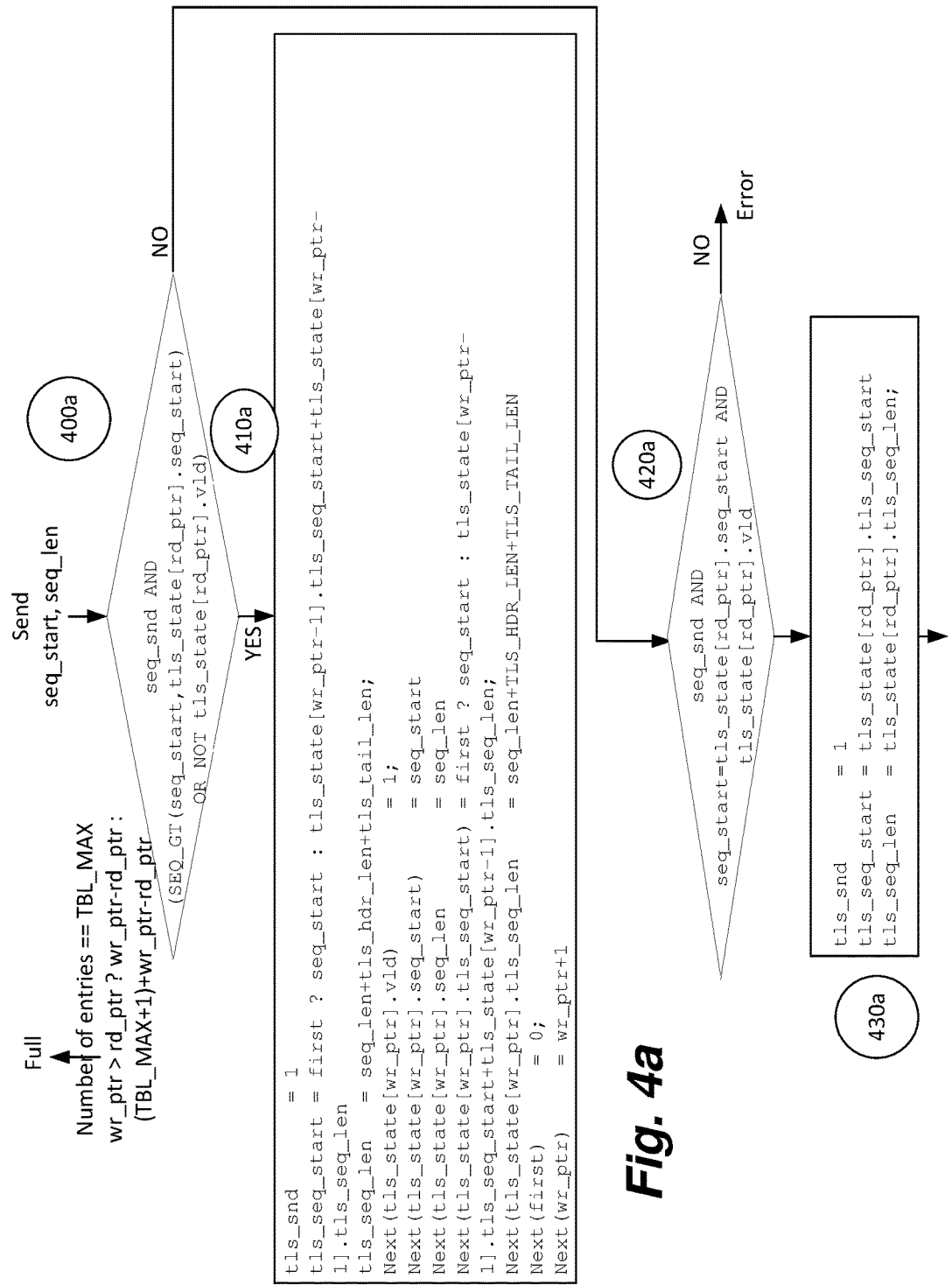

Refer now to FIG. 4a that is a pseudo-code description of the management of the table map, when the TCP/IP stack sends a TCP segment with sequence number seq_start and length seq_len. The map_table is initially empty and rd_ptr and wr_ptr are both zero. When a send segment arrives, it is accepted if the table is not full, as determined by computing the difference of the values of the pointers. When the send seq_no is greater than the sequence number of the tls_state[rd_ptr] entry or the table is empty and tls_state[rd_ptr].vld is 0, the segment is sent and a new tls_state entry is allocated with the seq_start, seq_len, tls_seq_start start and tls_seq_len. Initially the TCP sequence number and the TLS sequence number are equal but, once sending has started, the TLS sequence number is ahead by the cumulative number of bytes in the TLS header and TLS tail. The flag indicating the first segment has been sent is set to 0 and the wr_ptr index incremented.

Figure 4B:
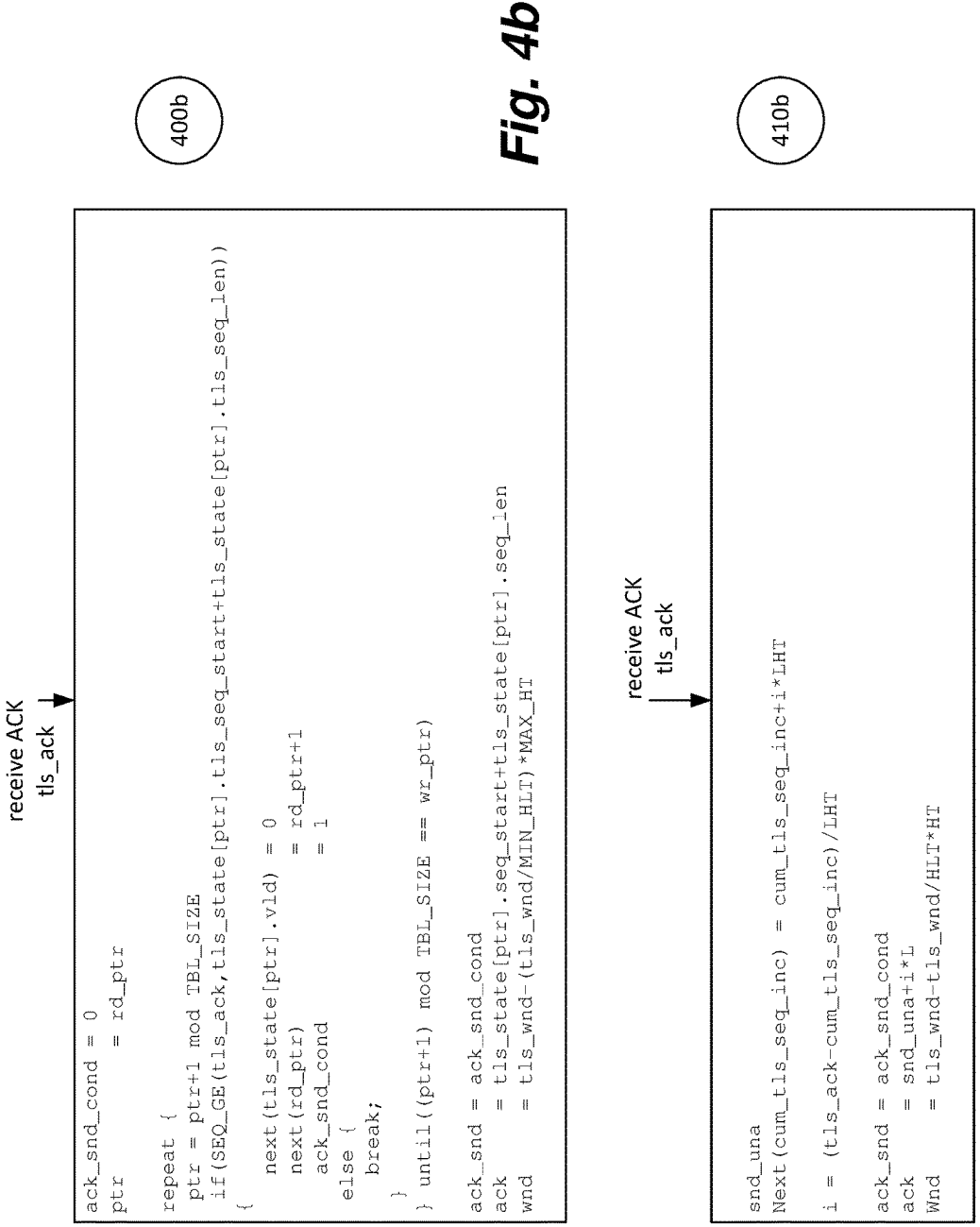

Refer now to FIG. 4b that is a description of two methods to manage the table map when a TCP/IP ACK arrives with sequence number tls_ack. Referring to the top half of FIG. 4b, the table map is traversed starting with the oldest entry, the rd_ptr entry, and it is checked if the tls_ack acks that PDU, in which case the entry is freed by clearing the vld bit and if at least one PDU is acknowledged by tls_ack and ACK is sent to the host stack ack_cnd_cond. If tls_ack doesn't acknowledge any PDU, no ACK is sent to the host stack and if tls_ack is not on a PDU boundary, an ack corresponding to the previous PDU is sent. The ack will have a sequence number tls_state[ptr].seq_start+tls_state[ptr].seq_len where ptr is the newest PDU containing the tls_ack. The tls_wnd window size contained in the tls_ack needs to subtract the PDU that will fill that window before sending an ack back to the TCP/IP stack. For this purpose, a MIN_HLT, a minimum size for the TLS header, TLS payload, and TLS tail, is used, in order to compute a worst case maximum number of PDU that would fit the window, and a maximum TLS header and TLS tail is used to multiply the number of PDU to compute the largest PDU overhead, and this number is then used to compute the wnd advertised to the TCP/IP stack wnd=tls_wnd−(tls_wnd/MIN_HLT)*MAX_HT.

We have described a general implementation of the map_table, but it is possible to optimize this implementation when the TLS header length and the tail length don't change with every PDU.

Refer now to lower half of FIG. 4b. When content is being streamed, the TLS header length, cipher text payload length for each PDU, and the TLS tail length, is typically fixed the equation simplifies to the following: len[i]=L, hdr[i]=H and tail[i]=T, and we call HLT=H+L+T. Then if snd_una is the oldest sequence number that has not been acknowledged and cum_tls_seq_start is the cumulative byte increment of the TLS headers and TLS tail, then the sequence number of subsequent PDU can be computed by the following equation as:

$$seq\_start[i]=cum\_tls\_seq\_start+(i-1)*L$$

where i is the PDU offset from the snd_una PDU and tls_seq_start[i]=cum_tls_seq_inc+(i−1)*HLT. The inverse mapping for incoming tls_ack be performed by solving for $$i=1+(tls\_seq\_start[i]-cum\_tls\_seq\_start)/HLT$$

The wnd is computed from tls_wnd by subtracting the TLS header and TLS tail bytes from the window $$wnd=tls\_wnd-tls\_wnd/HLT*HT$$

where HT is the length of the TLS header plus the length of the TLS tail.

Refer now to FIG. 5 that describes how the sequence number map from FIG. 3 and FIG. 4 can be integrated with a modified TCP/IP network stack. The application clear text data 500 is here written to a special socket referred to as a TLS socket 510 that has the purpose of preparing a PDU including the application clear text data 500 for formatting by the network adaptor according to the cryptographic protocol. This includes, for example, the purpose 520 of prepending the application data with a TLS header and appending the application data with padding and appending a placeholder for the MAC that that will subsequently be computed by the in-line crypto engine. The header and padding and MAC are written at this point so that the expanded stream can be written 530 with the regular TCP socket write to the TCP/IP stack 540. The data written to the TCP/IP stack 540 has a TLS header with all or only some of the fields initialized, the data is clear text data, and the MAC field is not set; it will be computed and set by the crypto engine, but there is space reserved in the byte stream and the size of the byte stream seen by the host TCP/IP stack is the same as the size of the stream after it has been encrypted and the MAC computed when it is sent by the NIC. Referring back to FIG. 2, by further modifying the host TCP/IP software stack, the TCP stream 211 has been expanded to the TCP stream with TLS PDU 212. The modified TCP/IP stack may track of the PDU boundaries by, for example, implementing a sequence map table similar to the one shown in FIG. 4, or the NIC TLS driver 550 provides the PDU length information when host TCP/IP software stack is required to re-transmit a TLS PDU. The seq_start and seq_len information need not be utilized in this case and when all the TLS PDU have the same length or most of them have the same length the iterative computation described above can be used.

We note that the prepend and append operations are typically performed on linked data structures and therefore do not require copying around the application data 500 but instead involve manipulating linked data structures and therefore require much less memory bandwidth than copying the whole application data stream to a crypto coprocessor and writing the result back to memory.

Figure 7:
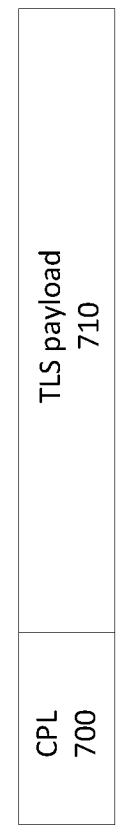
FIG. 7 is a CPL encapsulated TLS payload.

Referring to FIG. 7, the host message, which is a complete TLS record is sent to hardware for inline crypto operation. Host and hardware communicate using Chelsio Protocol Language (CPL), a control and data path protocol. The control messaging is used in bi-directional communication and provides host generated CPL request with corresponding generated replies, and conversely, NIC generated CPL request with corresponding host replies. CPL message CPL_TX_SEC_PDU 550 encapsulates the TLS record on transmit and receive path.

The CPL_TX_SEC_PDU message shown in Table 1 carries the information to encrypt and calculate a digest over a TLS record, and NIC TLS driver 550 enables the place holder bits for MAC and padding before sending TLS payload to network adapter. MAC and padding though set to zero is populated by TLS processing engine present on network adapter before sending TLS record on wire.

The following table shows an example of field details for the CPL_TX_SEC_PDU command.

Auth* Start and Stop offsets indicate on what part of the Payload Data Authentication engine should be run. Similarly, Cipher* offsets indicate the data chunk on which Cipher operation should be performed. AuthInsrtOffset would indicate where the result of Authentication (MAC) should be placed. In Decryption case this field would indicate location of MAC.

CPL_TX_SEC_PDU also carry the information used for security processing of TLS payload, including the cipher

TABLE 1

| CPL_TX_SEC_PDU | |
|---|---|
| Type | Description |
| 0x8A | Opcode value |
| Reserved1 | |
| CplLen | Length of CPL header encapsulated in 64b flits |
| Reserved2 | |
| PlaceHolder | In case of TLS Protocol type, this bit indicates the presence of MAC and PADDING place holders. Place holder bytes must be zero. In case of non-TLS protocol, this bit indicates the presence of MAC place holer. |
| IvInsrtOffset | Insertion/Location for IV |
| Reserved3 | |
| PldLen | Length of encapsulated payload, not including outer and inner CPL headers |
| AadStartOffset | Offset in bytes for AAD start from the first byte following the pkt headers (0-255 bytes) |
| AadStopOffset | Offset in bytes for AAD start from the first byte following the pkt headers (0-511 bytes) |
| CipherStartOffset | Offset in bytes for encryption/decryption start from the first byte following the pkt headers (0-1023 bytes) |
| CipherStopOffset | Offset in bytes for encryption/decryption end from end of the payload of this command (0-511 bytes) |
| AuthStartOffset | Offset in bytes for authentication start from the first byte following the pkt headers (0-1023 bytes) |
| AuthStopOffset | Offset in bytes for authentication end from end of the payload of this command (0-511 Bytes) |
| AuthInsrtOffset | Offset in bytes for authentication insertion from end of the payload of this command (0-511 Bytes) |
| Scmd0 | Flit 0 of SCMD |
| Scmd1 | Flit 1 of SCMD |

CPL_TX_SEC_PDU is used to invoke generic crypto processing of payload. It could be used for TLS/DTLS Encryption and Decryption, IPSEC Encryption and Decryption and as Crypto Co-Processor mode for following ciphers and digest operations:

a. SHA1/SHA2 Hash and HMAC computation.
b. AES-GMAC/CBCMAC/CMAC computation.
c. AES-CBC, GCM, CTR, CCM, XTS Encryption and Decryption.

CPL_TX_SEC_PDU fields specify offsets are programmable based on which control plane can convey to hardware the processing need for each crypto operation. Aad* and suite selected for crypto and hashing, sequence of authentication and cipher operations, tls record sequence number for digest and additional authenticated data of GCM.

The CPL_TX_SEC_PDU is followed by a 128-bit SCMD (Security Command) field Table 2 which is described in CPL_TLS_TX_SCMD_FMT. The SCMD provides controls like Cipher Mode, Authentication Mode, etc. which are used to convey what type of processing is needed on the current data.

The following table shows the field details for the CPL_TLS_TX_SCMD_FMT command.

TABLE 2

| CPL_TLS_TX_SCMD_FMT | | | |
|---|---|---|---|
| Flit | Field | Type | Description |
| 0 | 63:63 | 0x00 | |
| 0 | 62:61 | SeqNumberCtrl | 0: Not Present, 1: 32 bit\; 2: 48 bit, 3: 64 bit |
| 0 | 60:60 | Reserved1 | |
| 0 | 59:56 | ProtoVersion | Protocol Version: \; 0: TLS 1.2, 1: TLS 1.1, 2: DTLS 1.2, 3: DTLS 1.0\; 4: Generic Sec\; 5: TLS Custom ProtoVersion, 6: DTLS Custom ProtoVersion\; 7-15: Reserved\; Custom ProtoVersion is decoded from CustomProtoVer field of CPL_TX_TLS_SFO/PDU CPLs. |
| 0 | 55:55 | EncDecCtrl | Encryption Decryption Control: \; 0: Encryption Operation\; 1: Decryption Operation |

TABLE 2-continued

CPL_TLS_TX_SCMD_FMT

| Flit | Field | Type | Description |
|---|---|---|---|
| 0 | 54:54 | CiphAuthSeqCtrl | Cipher Authentication Sequence Control: \; 0: Message Authentication followed by Cipher(AuthFirst)\; 1: Cipher Followed by Authentication(CiphFirst) |
| 0 | 53:50 | CiphMode | Cipher Mode: \; 0: NOP, 1: AES-CBC, 2: AES-GCM, 3: AES-CTR\; 4: Generic AES, 5: IPSEC_ESP\; 6: XTS, 7: AES-CCM, 8-15: Reserved |
| 0 | 49:46 | AuthMode | Auth Mode: \; 0: NOP, 1: SHA1, 2: SHA2-224, 3: SHA2-256\; 4: GHASH\; 5: SHA512_224, 6: SHA512_256, 7: SHA512_384, 8: SHA512_512\; 9: CBCMAC, 10: CMAC, 11-15: Reserved |
| 0 | 45:43 | HmacCtrl | HMAC Control: \; 0: NOP, 1: No Truncation\; 2: 80-bit RFC 4366 HMAC Truncation\; 3: IP Sec 96 bits\; 4-6: PL Configurable Truncations\; 7: Div-by-2 Truncation. |
| 0 | 42:39 | IvSize | IV Size in Units of 2 bytes |
| 0 | 38:32 | NumIvs | Number of IVs |
| 0 | 30:30 | IVGenCtrl | IV Generation Control: \; 0: IV Generated in HW\; 1: IV Generated by SW (lower performance) |
| 0 | 29:21 | Reserved2 | |
| 0 | 13:0 | HdrLength | Length of all headers excluding TLS header, present before start of crypto PDU/Payload. This data is considered as bypass by the Crypto block. |
| 1 | 63:0 | SeqNumber | the Sequence Number: State variable maintained for the connection. It increments for each subsequent packets. Helps in detection of missing or out of order TLS packets. It also provides protection against the replay attacks. |

CPL_TLS_TX_SCMD_FMT is not a CPL but follows CPL_TX_SEC_PDU CPLs and carries detailed information to control and define different crypto operations on the TLS payload or other application payload which utilize crypto processing on network adapter 14.

CPL_TLS_TX_SCMD_FMT contains a field to specify the protocol version of TLS and DTLS. The protocol version helps TLS engine running on network adapter 14 to create TLS header with right version populated. Another field, cipherAuthSeqCtrl, specifies the order of encryption and MAC generation.

CPL_TLS_TX_SCMD_FMT also carries information about cipher mode, authentication mode and HMAC control, negotiated between the TLS client and TLS server during protocol handshake. Ciphers, once negotiated and programmed with the TLS engine on the network adapter, is further used for payload encryption and MAC generation.

Another useful field in CPL_TLS_TX_SCMD_FMT is IVGenCtrl, which determines IV source. IV (Initialization Vector) is used for encryption by TLS version 1.1 and 1.2. IV can be generated at the host by software or at hardware by TLS engine. If IV is generated by an engine running on the network adapter, then a placeholder can be used after the TLS header, which is accounted for in tls_seq_len 212.

The TLS sequence number is a simple count of TLS messages sent and received. This is maintained implicitly and is not sent explicitly in the message. TLS sequence is used to prevent a reply attack. MAC is computed using MAC secret, sequence number, message length and contents. CPL_TLS_TX_SCMD_FMT carry the sequence number generated at host by TLS driver 550.

TLS handshake ensures that crypto keys are programmed and safely secured on network adapter 14 before the TLS payload is transmitted for encryption. The TLS driver populates the key address as present on adapter and send to adapter along with TLS payload and CPL_TX_SEC_PDU.

We have thus described an enhancement to the send processing of TLS/SSL encrypted data. While the description includes certain details and specific embodiments, the invention is defined by the claims, which need not be limited to such details and specific embodiments.

What is claimed is:

1. A method of communicating to a peer via a network, the method comprising:

receiving a segment formatted according to a first network protocol, the received segment formatted according to the first network protocol having clear-text payload data in a payload portion of the received segment;

performing a cryptographic operation on at least a portion of the clear-text payload data of the received segment, according to a cryptographic protocol, and embedding a protocol data unit (PDU) according to the cryptographic protocol into the payload portion of the received segment;

adjusting first network protocol header data, in a header portion of the received segment, to account for a change to the received segment resulting from the cryptographic operation performing step; and transmitting the received segment, having the embedded PDU according to the cryptographic protocol and the adjusted first network protocol header data, to a peer via the network using the first network protocol.

2. The method of claim 1, wherein:

the header data adjusting step includes mapping header data in the first network protocol header data of the received segment according to a mapping table.

3. The method of claim 2, wherein;

the header data adjusting step includes adjusting the first network protocol header data to account for additional data added to the payload portion of the received segment during the cryptographic operation performing step.

4. The method of claim 1, further comprising:

maintaining a header map, wherein the header adjusting step is responsive to the maintained header map.

5. The method of claim 4, wherein:

the header map maintaining step includes providing an entry for each received segment, wherein the header adjusting step for a particular received segment adjusts the first network protocol header data of the received segment based on the entry for that received segment.

6. The method of claim 1, wherein:
the received segment is a first received segment; and
the method further comprises:
- receiving a second segment formatted according to the first network protocol and corresponding to the first segment, indicating receipt of the first segment by the peer; and
- adjusting first network protocol data in the second received segment in a manner corresponding to the adjusting of header data of the first received segment.

7. The method of claim 6, further comprising:
maintaining a header map, the header map maintaining step including providing an entry for each first received segment, wherein the step of adjusting the header for a particular first received segment adjusts the first network protocol header data of the first received segment based on the entry for that first received segment and the step of adjusting the first network protocol data for the second received segment is also based on the entry for the first received segment to which the second received segment corresponds.

8. The method of claim 7, further comprising:
releasing the entry for each first received segment responsive to adjusting the data for the second received segment that corresponds to the first received segment.

9. The method of claim 1, wherein:
the received segment according to the first network protocol is a first received segment; and
the method further comprises:
- receiving a second segment according to the first network protocol identical to the first segment;
- adjusting header data in the second received segment in a manner identical to the adjusting of header data of the first received segment;
- performing the cryptographic operation on at least a portion of the clear-text payload data of the second received segment, according to the cryptographic protocol, and embedding a protocol data unit (PDU) according to the cryptographic protocol into the payload portion of the second received segment; and
- transmitting the second received segment, having the embedded PDU according to the cryptographic protocol and the adjusted header data, to the peer via the network using the first network protocol.

10. The method of claim 1, wherein:
the method is performed entirely by a network adaptor that is configured for communication with a local device via a local bus of the local device; and
in the segment receiving step, the segment transmitted according to the first network protocol is received by the network adaptor from the local device.

11. The method of claim 10, further comprising:
by a network stack executing on the local device, forming the segment that is received at the receiving step.

12. The method of claim 1, wherein:
the segment receiving step and header adjusting step are performed by a local device; and
all remaining steps of the method of claim 1 are performed by a network adaptor that is configured for communication with the local device via a local bus of the local device.

13. A network adaptor configured for communication with a local device via a local bus of the local device, the network adaptor configured to:
receive, from the local device, a segment formatted according to a first network protocol, the received segment formatted according to the first network protocol having clear-text payload data in a payload portion of the received segment;
perform a cryptographic operation on at least a portion of the clear-text payload data of the received segment, according to a cryptographic protocol, and embed a protocol data unit (PDU) according to the cryptographic protocol into the payload portion of the received segment;
adjust first network protocol header data, in a header portion of the received segment, to account for a change to the received segment resulting from the cryptographic operation performing step; and
transmit the received segment, having the embedded PDU according to the cryptographic protocol and the adjusted first network protocol header data, to a peer via the network using the first network protocol.

14. The network adaptor of claim 13, wherein being configured to adjust header data includes being configured to map header data in the header data of the received segment according to a mapping table.

15. The network adaptor of claim 13, wherein being configured to adjust header data includes being configured to adjust the header data to account for additional data added to the payload of the received segment during the cryptographic operations performing step.

16. The network adaptor of claim 13, further configured to:
maintain a header map, wherein the header adjusting is responsive to the maintained header map.

17. The network adaptor of claim 16, wherein:
being configured to maintain a header map includes being configured to provide an entry for each received segment, wherein the header adjusting step for a particular received segment adjusts the header of the received segment based on the entry for that received segment.

18. The system of claim 17, wherein the local device is configured to adjust the header data.

19. The system of claim 17, wherein the network adaptor is configured to adjust the header data.

20. A system comprising:
a network adaptor configured for communication with a local device via a local bus of the local device; and
the local device;
wherein:
the network adaptor is configured to:
- receive, from the local device, a segment formatted according to a first network protocol, the received segment formatted according to the first network protocol having clear-text payload data in a payload portion of the received segment;
- perform a cryptographic operation on at least a portion of the clear-text payload data of the received segment, according to a cryptographic protocol, and embedding a protocol data unit (PDU) according to the cryptographic protocol into the payload portion of the received segment; and
- transmit the received segment, having the embedded PDU according to the cryptographic protocol and adjusted header data, to a peer via the network; and
the local device is configured to:
send to the network adaptor a segment formatted according to a first network protocol, the received segment having clear-text payload data in a payload portion of the received segment; and the system is further configured to adjust header data, in a first network protocol header portion of the received segment, to account for a change to the payload portion of the received segment resulting from the cryptographic operation performed by the network adaptor.

* * * * *